United States Patent [19]

Drawert et al.

[11] 4,045,389

[45] Aug. 30, 1977

[54] METHOD OF ADHERING TEXTILES WITH A POLYAMIDE MELT ADHESIVE

[75] Inventors: Manfred Drawert, Froendenberg-Strickherdicke; Eugen Griebsch, Nordkirchen; Wolfgang Imöehl, Unna, all of Germany

[73] Assignee: Schering Aktiengesellschaft, Berlin and Bergkamen, Germany

[21] Appl. No.: 709,116

[22] Filed: July 27, 1976

[30] Foreign Application Priority Data

July 31, 1975 Germany .............................. 2534121
Apr. 10, 1976 Germany .............................. 2615765
Apr. 10, 1976 Germany .............................. 2615766

[51] Int. Cl.$^2$ .............................................. C09J 3/16
[52] U.S. Cl. ................................. 260/18 N; 156/331; 156/332; 260/404.5; 428/474
[58] Field of Search ............... 260/18 N, 404.5, 18 N, 260/404.5 PA; 156/331, 332; 428/474

[56] References Cited

U.S. PATENT DOCUMENTS

| 3,447,999 | 6/1969 | Rogier et al. ............ 260/18 N |
| 3,499,853 | 3/1970 | Griebsch et al. ......... 260/18 N |
| 3,637,550 | 1/1972 | Sprauer .................... 260/18 N |
| 3,637,551 | 1/1972 | Sprauer .................... 260/18 N |
| 3,639,313 | 2/1972 | Gruben et al. ............ 260/18 N |
| 3,781,234 | 12/1973 | Drawert et al. .......... 260/18 N |
| 3,859,234 | 1/1975 | Peerman .................. 260/18 N |

FOREIGN PATENT DOCUMENTS

| 1,000,216 | 8/1965 | United Kingdom ........... 260/18 N |

OTHER PUBLICATIONS

"Textilveredelung" vol. 9 (1974) p. 24.

*Primary Examiner*—Eugene C. Rzucidlo
*Attorney, Agent, or Firm*—Curtis, Morris & Safford

[57] ABSTRACT

A polyamide melt adhesive having a melt viscosity, measured at 220° C., of 25–600 Pas and adaptable for the adhesion of textiles, said polyamide comprising a. 1. dimerized fatty acid having a content of 70–100 percent by weight of dimeric fatty acid, and optionally comprising 2. a monocarboxylic acid as a molecular-weight regulator (chain stopper), whereby up to 50 equivalent percent of the total carboxy groups of the mixture (a) (1) and (2) can be derived from the monocarboxylic acid; and comprising b. one or more aliphatic straight chain co-dicarboxylic acids having 6–13 carbon atoms, wherein the ratio of carboxylic acids according to (a) (1) and (2) to carboxylic acid according to (b) is from 0.05:1 to 5:1, calculated on the carboxy groups; and further comprising in an amount approximately equivalent to the acids mentioned under (a) and (b) above c. an aliphatic straight chain diprimary diamine having 6–12 carbon atoms, and d. caprolactam and/or ε-aminocaproic acid, wherein from 0.5 to 1.5 mols of caprolactam and/or ε-aminocaproic acid are employed per mol of carboxy groups of the acids mentioned under (a) and (b) above.

6 Claims, No Drawings

METHOD OF ADHERING TEXTILES WITH A POLYAMIDE MELT ADHESIVE

The present invention relates to melt adhesives comprising polyamides, which adhesives are particularly adaptable for adhering textiles to each other or to other materials.

From a series of German patent publications (e.g. DOS No. 1,939,758, DOS No. 2,204,492, and DOS No. 2,209,035), copolyamides are known which are used for the adhesion of textiles and which contain as their principal ingredient 11-amino-undecanoic acid or lauric lactam. These starting materials are difficult to obtain and, further, the copolyamides prepared comprising these materials still show certain defects, such as, for example, an often-bad wet tear strength after cleaning or washing as well as insufficient adhesion values when the melt adhesive has a low softening point.

Adhesive bonds with an unsatisfactory resistance to halogenated hydrocarbons or to alkalis used in washing are obtained with the heretofore-known polyamides comprising dimeric fatty acids or polyamides comprising caprolactam. When textiles are adhered, however, the wet tear strength must show high values since, in cleaning processes, the adhesion bond is exposed to strong mechanical stresses. From the point of view of technical operations, further, in general a low softening point is desired in the textile adhesive.

The present invention has as its object to overcome the disadvantages of the state of the art and to find textile adhesives comprising copolyamides, which textile adhesives will have a high wet tear strength and resistance to washing alkalis and to halogenated hydrocarbons. This object, furthermore, is to be achieved without using the long-chain amino acids, or their lactams, heretofore found necessary for achieving a useful spectrum of properties.

This object has been achieved according to the present invention by the use of adhesives comprising polyamides having melt viscosities (measured at 220° C.) of 25–600 Pas (1 Pas = 10 poises) for the adhesion of textiles, which melt adhesives comprise a. 1. a dimerized fatty acid having a content of 70–100 percent by weight of dimeric fatty acid and optionally comprising
2. monocarboxylic acids as viscosity regulators (molecular-weight regulator), wherein up to 50 equivalent percent of the total carboxyl groups of mixture (a) (1) and (2) can be derived from monocarboxylic acids; and further comprising
b. one or more aliphatic straight-chain co-dicarboxylic acids having from 6–13 carbon atoms, wherein the ratio of the carboxylic acids according to (a) (1) and (2) to the carboxylic acids according to (b) is 0.05:1 to 5:1, calculated on the carboxylic acid groups; and further comprising an amount approximately equivalent to the acids identified in (a) and (b) above of
c. an aliphatic straight-chain diprimary diamine having 6 to 12 carbon atoms, and of
d. caprolactam and/or $\epsilon$-aminocaproic acid, wherein from 0.5 to 1.5 mols of caprolactam and/or $\epsilon$-aminocaproic acid are employed per mol of carboxy groups of the acids mentioned under (a) and (b).

A further embodiment of the melt adhesives according to the present invention is characterized in that the ratio of the carboxylic acids according to (a) (1) and (2) and to the carboxylic acids according to (b) is 0.1:1 to 3.0:1.

A further embodiment of the melt adhesives of the present invention is characterized in that sebacic acid is employed as the co-dicarboxylic acid according to (b).

A further embodiment of the melt adhesive of the present invention is characterized in that hexamethylene diamine is employed as the diamine according to (c).

A special embodiment of the melt adhesives of the present invention is characterized in that 0.8 to 1.2 mols of caprolactam and/or $\epsilon$-aminocaproic acid are employed per mol of the acids mentioned above under (a) and (b).

A special embodiment of the melt adhesive of the present invention is characterized in that as the dimerized fatty acid according to (a) 1., a dimerized fatty acid having a content of more than 90 percent by weight of dimeric fatty acid is employed.

The melt adhesives of the present invention, which comprise sufficient quantities of the aforementioned dimeric fatty acids, caprolactam or $\epsilon$-aminocaproic acid, diamines, and co-dicarboxylic acids, show a good resistance to halogenated hydrocarbons and simultaneously a good resistance to washing alkalis at 60° C. and, in part, also at 95° C. This resistance expresses itself by 1. very good initial tear strengths, i.e. values before stressing by washing or cleaning processes, and by
2. very high wet tear strengths, i.e. values after cleaning and in a still moist condition, and by
3. the outstanding tensile strength values after drying, which values are almost attained even after many washing or cleaning cycles.

By the use of distilled dimeric fatty acids, melt adhesives having an improved color number are obtained. On the other hand, the use of commercially available technical polymerized fatty acids for the preparation of melt adhesives is possible for special uses. When using technical dimeric fatty acids, it should be noted that the content of trimeric fatty acid should not exceed a maximum limit. This limit value depends on the dimeric and monomeric fatty acid content in a particular polymerized fatty acid and can be determined by orientation tests of the type carried out on a daily routine basis by one skilled in the art.

The expression "dimerized fatty acid" refers generally to polymerized acids which are obtained from "fatty acids". The term fatty acid encompasses unsaturated natural and synthetic monobasic aliphatic acids having from 12 to 22 carbon atoms, preferably 18 carbon atoms. These fatty acids can be polymerized according to known methods (cf. German patent publications DOS No. 1,443,938 and DOS No. 1,443,968 and German Pat. Nos. 2,118,702 and 1,280,852).

Polymeric fatty acids typically commercially available have about the following composition:

| Monomeric acids (Mo) | 5–15 % by weight |
| Dimeric acids (Di) | 60–80 % by weight |
| Trimeric acids (Tri) | 10–35 % by weight |

The content of dimeric acid can be raised by generally known distillation processes up to 100 percent by weight.

For the polyamides of the present invention, dimerized fatty acids having a content of more than 90 percent by weight of dimeric fatty acid and smaller amounts of trimeric fatty acid (2-6 percent by weight) and of monomeric fatty acid (0-1.5 % by weight), of a type generally commercially available, are preferably employed. It is also possible to use the dimerized fatty acids in their hydrogenated form.

The polyamides according to the present invention lie in a certain melt viscosity region which reflects a certain molecular weight region.

The adjustment of the melt viscosity can be achieved in a known fashion by breaking off the reaction at a desired degree of polymerization or by working with non-equivalent amounts of carboxylic acids or amines. Because of certain disadvantages of these methods, the use of monofunctional of monofunctionally-acting compounds (amines or carboxylic acids) as molecular-weight regulator is preferred. Such a use of monocarboxylic acids has proved to be particularly advantageous.

The possible content of monocarboxylic acids in the polymerized fatty acid employed according to the present invention can be raised up to 50 equivalent percent, based on the total carboxy group content of the mixture of polymeric fatty acid and monocarboxylic acid, by the addition of monocarboxylic acids. If the amount of the necessary molecular-weight regulator (viscosity regulator), here the monocarboxylic acid, is high, then high molecular weight monocarboxylic acids are preferred, such as oleic acid, stearic acid, linoleic acid, or linolenic acid, or mixtures of these materials such as tall oil fatty acid or soya oil fatty acid (or other hydrophobic monocarboxylic acids).

As examples of the aliphatic straight chain co-dicarboxylic acids having 6–13 carbon atoms which are used according to the present invention, adipic acid, nonamethylene dicarboxylic acid, decamethylene dicarboxylic acid, as well as brassylic acid can be mentioned. These dicarboxylic acids can be used alone or in admixture.

In place of the carboxylic acids, their esters with lower alcohols can optionally be employed. In this case, it is recommended, especially if the amount of ester is large, that the caprolactam polymerization be initiated by the addition of water.

As the aliphatic straight chain diprimary diamines having 6–12 carbon atoms which are to be used according to the present invention, 1,6-diaminohexane, 1,9-diaminononane, and 1,12-diaminododecane can be mentioned.

The amount of caprolactam, which is calculated on the mols of carboxyl groups in the acids employed, depends upon the value of the desired melting point. For the use of the melt adhesives as adhesives for textiles, the amount is generally 0.5 to 1.5 mols per mol of carboxy groups present in the polymerized fatty acid and the co-dicarboxylic acid or acids. If melting points above 140° C. are desired, then the amount of caprolactam or of ε-aminocaproic acid must be increased.

As concerns the materials to be adhered, textiles, optionally also siliconized fabrics, can be adhered to one another or, optionally, to leather, rubber, and other materials.

The polyamides to be used according to the present invention can be prepared by melt condensation of approximately equivalent amounts of the aforementioned reaction partners at temperatures between 200° and 290° C., particularly at about 250° C., under an inert gas. In the final phase of the reaction, a vacuum is employed to produce a faultless product. The melt viscosity of the polyamides according to the present invention should lie generally between 25 and 600 Pas, measured at 220° C.

DETERMINING THE SOFTENING POINT

The determination of this value is carried out on a Kofler bench in the following manner.

The finely-ground polyamide powder having a particle size between 0.3 and 0.5 mm was strewn on the Kofler bench. Then, at a temperature in the region of the softening point, a small piece of paper was pressed onto the bench and, after 90 seconds, slowly drawn off towards the cold side thereof. Within a definite temperature region, polyamide threads form between the Kofler bench and the paper being drawn off. This temperature region is defined as the softening point.

PREPARATION OF THE ADHERED MATERIALS

Strips of materials of a polyester/wool (55 percent/45 percent) 5 cm wide were adhered. The polyamide powder had a particle size of 300–500 microns. The amount employed was 20 g/m² of material.

The coated strips of material were adhered to a second uncoated strip of material at temperatures about 20°–30° C. above the softening point of the polyamide adhesive. The adhesion time was about 15–20 seconds and the adhesion pressure was 400 g/cm².

THE WASHING AND CLEANING PROCESS

For washing, a 3 percent washing solution of a commercially-available machine washing agent was used at temperatures of 60° and 95° C. The wash process at 60° C. lasted 45 minutes; that at 95° C. lasted 90 minutes. The washing programs include a rinsing and spinning step.

The material samples were subjected wet at room temperature to a test for their resistance to separation according to DIN 53274. The width of the sample in each case was 5 cm. Dry cleaning was carried out with perchloroethylene for 30 minutes at room temperature. The cleaned textile samples were again measured wet.

For the polyamides reported in the following Table, the following polymerized fatty acids were used:

Examples 1–8, 15–18, 22–25, and 27: dimerized tall oil fatty acid of the following composition

| Monomeric fatty acid (Mo) | 3.6 % by weight |
|---|---|
| Dimeric fatty acid (Di) | 94.2 % by weight |
| Trimeric fatty acid (Tri) | 2.2 % by weight |

Examples 9–13 and 19–21: dimerized oleic acid of the following composition

| Monomeric fatty acid (Mo) | 5.3 % by weight |
|---|---|
| Dimeric fatty acid (Di) | 93.3 % by weight |
| Trimeric fatty acid (Tri) | 1.4 % by weight |

Examples 14 and 26: dimerized soya oil fatty acid of the following composition

| Monomeric fatty acid (Mo) | 11.2 % by weight |
|---|---|
| Dimeric fatty acid (Di) | 76.3 % by weight |
| Trimeric fatty acid (Tri) | 12.5 % by weight |

A better understanding of the present invention and of its many advantages will be had by referring to the following specific Examples given by way of illustration.

EXAMPLE 1

In a reactor equipped with a descending condenser, a stirrer, and a thermometer, 79.61 g of dimerized tall oil fatty acid, 15.16 g of tall oil fatty acid, 127.36 g of sebacic acid, 91.57 g of 1,6-diaminohexane, and 177.97 g of caprolactam were weighed in and heated under nitrogen for a period of 2 hours at 250° C. and were held at this temperature for a further 2 hours. [In the mixture, the ratio of the carboxy groups of the fatty acid mixture according to (a) (1) and (2) to the co-dicarboxylic acid according to (b) is 0.25:1; the mixture contains 1.0 mol of caprolactam per mol of carboxy groups according to (a) and (b)]. Thereafter, a vacuum of 12 mm Hg was maintained for 2 hours at 250° C. and a vacuum of 2 mm Hg was applied for a further 2 hours in order to remove any residual water of condensation and free caprolactam.

The polyamide showed the following values:

| | |
|---|---|
| Softening point | 119° C. |
| Melt viscosity (220° C.) | 140.5 Pas |
| Resistance to separation (kg/5cm) | 4.0 (60° C. wash, wet tearing) |
| Resistance to separation (kg/5cm) | 2.6 (95° C. wash, wet tearing) |
| Perchloroethylene dry cleaning (kg/5cm) | 4.5 (wet tearing) |
| Starting value (kg/5cm) | 6.2 |

The polyamides shown in the following Table were prepared in the same manner.

TABLE 1

| Example | Composition | Ratio of Carboxy Groups of Acid Mixture (a): Co-Dicarboxylic Acid (b) | Mols of Caprolactam per Mol of Carboxy Groups |
|---|---|---|---|
| 2 | 24.76 g dimerized tall oil fatty acid<br>20.26 g tall oil fatty acid<br>57.70 g adipic acid<br>79.85 g sebacic acid<br>101.05 g 1,6-diaminohexane<br>178.54 g caprolactam | 0.1 : 1.0 | 0.9 |
| 3 | 117.99 g dimerized tall oil fatty acid<br>13.11 g tall oil fatty acid<br>92.99 g sebacic acid<br>80.21 g 1,6-diaminohexane<br>155.94 g caprolactam | 0.50 : 1.0 | 1.0 |
| 4 | 176.82 g dimerized tall oil fatty acid<br>11.28 g tall oil fatty acid<br>62.53 g azelaic acid<br>76.73 g 1,6-diaminohexane<br>149.16 g caprolactam | 1.0 : 1.0 | 1.0 |
| 5 | 225.06 g dimerized tall oil fatty acid<br>5.77 g tall oil fatty acid<br>54.58 g sebacic acid<br>78.51 g 1,6-diaminohexane<br>93.96 g caprolactam | 1.5 : 1.0 | 0.6 |
| 6 | 215.63 g dimerized tall oil fatty acid<br>6.66 g tall oil fatty acid<br>18.99 g adipic acid<br>60.49 g 1,6-diaminohexane<br>161.59 g caprolactam | 3.0 : 1.0 | 1.4 |
| 7 | 215.63 g dimerized tall oil fatty acid<br>6.66 g tall oil fatty acid<br>26.16 g sebacic acid<br>60.49 g 1,6-diaminohexane<br>161.59 g caprolactam | 3.0 : 1.0 | 1.4 |
| 8 | 221.16 g dimerized tall oil fatty acid<br>6.84 g tall oil fatty acid<br>20.22 g sebacic acid<br>58.17 g 1,6-diaminohexane<br>146.90 g caprolactam | 4.0 : 1.0 | 1.3 |
| 9 | 171.46 g dimerized oleic acid<br>10.94 g soya oil fatty acid<br>23.37 g adipic acid<br>30.32 g azelaic acid<br>74.43 g 1,6-diaminohexane<br>144.64 g caprolactam | 1.0 : 1.0 | 1.0 |
| 10 | 19.95 g dimerized oleic acid<br>19.95 g oleic acid<br>141.51 g sebacic acid<br>121.68 g 1,9-diaminononane<br>158.20 g caprolactam | 0.1 : 1.0 | 0.9 |
| 11 | 146.9 g caprolactam<br>20.38 g dimerized oleic acid<br>16.66 g stearic acid<br>131.40 g sebacic acid<br>143.00 g 1,12-diaminododecane | 0.1 : 1.0 | 0.9 |
| 12 | 113.00 g caprolactam<br>132.53 g dimerized oleic acid<br>9.97 g tall oil fatty acid<br>115.67 g decamethylene dicarboxylic acid<br>87.22 g 1,6-diaminohexane | 0.5 : 1.0 | 0.67 |
| 13 | 132.53 g dimerized oleic acid<br>9.97 g tall oil fatty acid<br>122.00 g brassylic acid<br>87.71 g 1,6-diaminohexane<br>113.00 g caprolactam | 0.5 : 1.0 | 0.67 |
| 14 | 718.2 g dimerized soya oil fatty acid<br>147.2 g soya oil fatty acid<br>613.8 g sebacic acid<br>529.4 g 1,6-diaminohexane | 0.5 : 1.0 | 1.0 |

TABLE 1-continued

| Example | Composition | Ratio of Carboxy Groups of Acid Mixture (a): Co-Dicarboxylic Acid (b) | Mols of Caprolactam per Mol of Carboxy Groups |
|---|---|---|---|
| 15 | 1029.6 g caprolactam<br>76.77 g dimerized tall oil fatty acid<br>3.79 g acetic acid<br>127.30 g sebacic acid<br>92.57 g 1,6-diaminohexane | 0.25 : 1.0 | 1.0 |
| 16 | 177.97 g caprolactam<br>75.82 g dimerized tall oil fatty acid<br>18.57 g diphenolic acid<br>127.36 g sebacic acid<br>91.57 g 1,6-diaminohexane | 0.25 : 1.0 | 1.0 |
| 17 | 177.97 g caprolactam<br>75.82 g dimerized tall oil fatty acid<br>8.37 g cyclohexene-3-carboxylic acid<br>127.36 g sebacic acid<br>91.57 g 1,6-diaminohexane | 0.25 : 1 | 1.0 |
| 18 | 177.97 g caprolactam<br>80.55 g dimerized tall oil fatty acid<br>6.07 g benzoic acid<br>127.36 g sebacic acid<br>91.57 g 1,6-diaminohexane | 0.25 : 1 | 1.0 |
| 19 | 177.97 g caprolactam<br>22.23 g dimerized tall oil fatty acid<br>14.81 g tall oil fatty acid<br>131.40 g sebacic acid<br>143.00 g 1,12-diaminododecane | 0.1 : 1.0 | 0.9 |
| 20 | 146.90 g caprolactam<br>136.80 g dimerized tall oil fatty acid<br>5.70 g tall oil fatty acid<br>115.67 g decamethylene dicarboxylic acid<br>87.22 g 1,6-hexamethylene diamine | 0.5 : 1.0 | 0.67 |
| 21 | 113.00 g caprolactam<br>139.50 g dimerized tall oil fatty acid<br>2.85 g tall oil fatty acid<br>136.00 g dimethylbrassylate<br>87.71 g 1,6-diaminohexane | 0.5 : 1.0 | 0.67 |
| 22 | 113.08 g caprolactam<br>222.29 g dimerized tall oil fatty acid<br>18.99 g adipic acid<br>60.49 g 1,6-diaminohexane | 3.0 : 1.0 | 1.4 |
| 23 | 161.59 g caprolactam<br>228.00 g dimerized tall oil fatty acid<br>20.22 g sebacic acid<br>58.17 g 1,6-diaminohexane | 4.0 : 1.0 | 1.3 |
| 24 | 146.19 g caprolactam<br>79.61 g dimerized tall oil fatty acid<br>3.19 g acetic acid<br>127.36 g sebacic acid<br>91.57 g 1,6-diaminohexane | 0.25 : 1.0 | 1.0 |
| 25 | 177.92 g caprolactam<br>79.61 g dimerized tall oil fatty acid<br>6.70 g cyclohexene-3-carboxylic acid<br>127.36 g sebacic acid<br>91.57 g 1,6-diaminohexane | 0.25 : 1.0 | 1.0 |
| 26 | 177.97 g caprolactam<br>78.75 g dimerized tall oil fatty acid<br>7.78 g tall oil fatty acid<br>61.38 g sebacic acid<br>52.94 g 1,6-diaminohexane | 0.5 : 1.0 | 1.0 |
| 27 | 102.96 g caprolactam<br>87.19 g dimerized tall oil fatty acid<br>4.20 g isononane acid<br>127.36 g sebacic acid<br>91.57 g 1,6-diaminohexane<br>177.97 g caprolactam | 0.25 : 1.0 | 1.0 |

TABLE 2

| Example | Softening Point | Melt Viscosity at 220° C.(Pas) | Initial Value | Resistance to Separation (kg/5cm) Wash, Wet-Tearing | Resistance to Separation (kg/5cm) Perchloroethylene Cleaning, Wet-Tearing |
|---|---|---|---|---|---|
| 2 | 127° C. | 106.4 | 5.8 | 3.2 | 5.5 |
| 3 | 104° C. | 123.5 | 6.0 | 4.0 | 4.0 |
| 4 | 105° C. | 36.0 | 5.1 | 2.8 | 2.8 |
| 5 | 90° C. | 59.6 | 5.5 | 2.8 | 2.9 |
| 6 | 138° C. | 49.1 | 5.6 | 2.8 | 3.4 |
| 7 | 125° C. | 47.3 | 5.4 | 3.2 | 2.8 |
| 8 | 112° C. | 29.0 | 5.9 | 3.6 | 2.2 |
| 9 | 124° C. | 44.7 | 5.0 | 2.8 | 3.0 |
| 10 | 121° C. | 69.0 | 5.7 | 3.6 | 3.2 |
| 11 | 131° C. | 114.0 | 6.0 | 3.4 | 3.4 |
| 12 | 140° C. | 65.8 | 5.8 | 4.0 | 3.5 |
| 13 | 127° C. | 28.5 | 5.2 | 3.5 | 2.6 |
| 14 | 106° C. | 122.0 | 6.0 | 3.8 | 4.0 |
| 15 | 112° C. | 93.2 | 6 | 3.5 | 5.0 |
| 16 | 113° C. | 100.7 | 6 | 3.0 | 4.5 |
| 17 | 112° C. | 110.5 | 6 | 4.0 | 4.5 |
| 18 | 112° C. | 130.0 | 6 | 3.0 | 4.5 |

TABLE 2-continued

| Example | Softening Point | Melt Viscosity at 220° C.(Pas) | Initial Value | Resistance to Separation (kg/5cm) Wash, Wet-Tearing | Resistance to Separation (kg/5cm) Perchloroethylene Cleaning, Wet-Tearing |
|---|---|---|---|---|---|
| 19 | 131° C. | 16.0 | 5.8 | 3.5 | 4.0 |
| 20 | 140° C. | 195.2 | 6.0 | 3.6 | 4.5 |
| 21 | 127° C. | 254.5 | 5.0 | 3.7 | 2.9 |
| 22 | 138° C. | 227.0 | 5.6 | 3.2 | 4.4 |
| 23 | 112° C. | 183.1 | 5.8 | 3.6 | 2.4 |
| 24 | 115° C. | 230.0 | 6.1 | 3.7 | 5.0 |
| 25 | 117° C. | 176.8 | 6.0 | 4.2 | 4.6 |
| 26 | 106° C. | 540.0 | 8.0 | 3.5 | 5.0 |
| 27 | 110° C. | 153.4 | 6 | 4.0 | 4.5 |

What is claimed is:

1. In the method of adhering textiles with a melt adhesive, the improvement wherein said melt adhesive is a polyamide melt adhesive having a melt viscosity, measured at 200° C, of 25–600 Pas and which is the reaction product of approximately equivalent amounts of an acid component and a basic component, said acid component comprising
   a. 1. a dimerized fatty acid having a content of 70–100 percent by weight of dimeric fatty acid and, optionally,
   2. a monocarboxylic acid, as a molecular weight regulator, whereby up to 50 equivalent percent of the total carboxy groups of the mixture (a) (1) and (2) can be derived from the monocarboxylic acid, and
   b. one or more aliphatic straight chain co-dicarboxylic acids having 6–13 carbon atoms, wherein the ratio of carboxylic acids according to (a) (1) and (2) to carboxylic acid according to (b) is from 0.05:1 to 5:1, calculated on the carboxy groups, said basic component comprising
   c. an aliphatic straight chain diprimary diamine having 6–12 carbon atoms and
   d. caprolactam, ε-aminocaproic acid, or mixtures thereof such that from 0.5 to 1.5 mols of caprolactam, ε-aminocaproic acid, or mixtures thereof are reacted per mol of carboxyl groups in said acid component.

2. A method as in claim 1 wherein, in said polyamide melt adhesive, 0.8 to 1.2 mols of caprolactam, ε-aminocaproic acid, or mixtures thereof are employed per mol of carboxy groups in said acid component.

3. A method as in claim 1 wherein said dimerized fatty acid according to (a) (1) is a fatty acid having a content of more than 90 percent by weight of dimeric fatty acid.

4. A method as in claim 1 wherein the ratio of carboxylic acids according to (a) (1) and (2) to carboxylic acid according to (b) in said polyamide melt adhesive is between 0.1:1 and 3.0:1.

5. A method as in claim 1 wherein, in said polyamide melt adhesive, sebacic acid is the co-dicarboxylic acid according to (b).

6. A method as in claim 1 wherein, in said polyamide melt adhesive, hexamethylene diamine is the diamine according to (c).

* * * * *